United States Patent [19]
Ishizawa et al.

[11] Patent Number: 5,956,017
[45] Date of Patent: *Sep. 21, 1999

[54] ELECTRONIC INFORMATION APPARATUS

[75] Inventors: Shoichi Ishizawa; Kyoichi Ideno, both of Suwa, Japan

[73] Assignee: Seiko Epson Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/932,968

[22] Filed: Sep. 18, 1997

Related U.S. Application Data

[63] Continuation of application No. 08/370,350, Jan. 9, 1995, abandoned, which is a continuation of application No. 07/857,161, Mar. 25, 1992, abandoned.

[30] Foreign Application Priority Data

Mar. 25, 1991 [JP] Japan .................................. 3-060053
Mar. 25, 1991 [JP] Japan .................................. 3-060055

[51] Int. Cl.⁶ .................................................. G09G 5/00
[52] U.S. Cl. ........................... 345/156; 345/901; 379/61; D14/106
[58] Field of Search ..................................... 345/156, 168, 345/167, 901; 364/708.1, 708.12; 361/680, 681; 379/61; D14/106

[56] References Cited

U.S. PATENT DOCUMENTS

| | | | |
|---|---|---|---|
| 4,483,634 | 11/1984 | Frey et al. ............................... | 400/489 |
| 4,661,659 | 4/1987 | Nishimura .................................. | 379/61 |
| 4,803,652 | 2/1989 | Maeser et al. ........................... | 364/200 |
| 4,808,017 | 2/1989 | Sherman et al. ......................... | 340/711 |
| 4,839,837 | 6/1989 | Chang . | |
| 4,847,799 | 7/1989 | Morita et al. . | |
| 4,973,176 | 11/1990 | Dietrich .................................... | 340/710 |
| 4,974,183 | 11/1990 | Miller . | |
| 5,049,863 | 9/1991 | Oka . | |
| 5,323,291 | 6/1994 | Boyle et al. ............................. | 395/500 |
| 5,416,498 | 5/1995 | Grant ...................................... | 345/168 |
| 5,475,399 | 12/1995 | Borsuk .................................... | 345/901 |

FOREIGN PATENT DOCUMENTS

| | | |
|---|---|---|
| 0327408 | 8/1989 | European Pat. Off. . |
| 3833854 | 12/1990 | Germany . |
| 2209100 | 2/1990 | Japan . |
| 9013213 | 11/1990 | United Kingdom . |
| WO91/04461 | 4/1991 | WIPO . |

OTHER PUBLICATIONS

"Power Books" Macintosh, Dec. 1991, pp. 130–133.

IBM Technical Disclosure Bulletin, vol. 29, No.7; Dec. 1986, p. 3110; Split Keyboard.

Ken Sakamura, The Tron Project; IEEE Micro; vol. 7, No. 2, Apr. 1987; pp. 8–14.

Enlarged Cursor Key with Trackball; IBM Technical Disclosure Bulletin; vol. 33, No. 9, Feb. 1991, pp. 428–430.

Patent Abstracts of Japan, vol. 014, No. 504, p. 1127; Nov. 1990.

*Primary Examiner*—Amare Mengistu
*Attorney, Agent, or Firm*—Loeb & Loeb LLP

[57] ABSTRACT

There is disclosed an electronic information apparatus comprising an appratus body; display provided to the apparatus body for displaying a data on a screen thereof and a key board having plural input keys and provided at a front side on an upper surface of the apparatus body, the plural input keys being divided into two groups, the groups being spaced with each other, the plural input keys of each group being arranged in plural rows, row arrangement directions of the groups acrossing each other with a predetermined angle, and the group being arranged as to be substatially symmetrical with respect to a center line extending from a front end of the key board to a back end of the key board.

1 Claim, 7 Drawing Sheets

FIG. 9

ELECTRONIC INFORMATION APPARATUS

This is a continuation of application Ser. No. 08/370,350, filed on Jan. 9, 1995 and now abandoned, which is itself a continuation of application Ser. No. 07/857,161, filed on Mar. 25, 1992, and also abandoned.

BACKGROUND OF THE INVENTION

1. Field of the Invention

This invention relates to an electronic information equipment such as a personal computer (hereinafter referred to as "PC"), a word processor (hereinafter referred to as "WP") or the like, and more particularly to an improvement in construction of a key board and a printer for the equipment.

2. Related Background Art

The conventional lap top type of electronic information equipment includes an equipment body mounted on a table, a key board which has plural input keys and is installed at a front side on an upper surface of the equipment body, a rotatable display which is pivotally mounted on a center portion on the upper surface of the equipment body in such a manner as to cover the key board, a built-in printer which is provided at an inner portion of the equipment body and serves to perform a printing on a recording sheet, a sheet supply port which is provided at an inner portion of the equipment body and through which the recording sheet is inserted, and a sheet discharge port which is provided at an inner portion of the equipment body and through which the printed recording sheet is discharged. The electronic information equipment may include a mouse or track ball as a instruction input device when it comprises a PC.

The key board has plural input keys which are actuated with a pushing operation and longitudinally and laterally arranged in a matrix. Ordinarily, the mouse and the track ball are optionally installed to the equipment body, and placed at a right or left side of the key board on the table. The mouse and the track, serving as the instruction input device, has an advantage which is not given to the input key, and they are operated solely or in parallel with an operation of the input key by an operator. The printer is so designed as to be operated after the display is slantly approached to the key board and a recording sheet is inserted through the sheet supply port.

Recently, miniaturization of an electronic information equipment has been required, and in association with this requirement a key board space has been required to be effectively used. However, the conventional lap top type electronic information equipment has been designed in the construction as described above, and the input keys are merely provided on the key board. Therefore, irrespective of the recent requirement of the effective use of the key board space, the effective use of the key board space has not been achieved in the conventional electronic information equipment.

In addition, the mouse and the track ball are placed at the right or left side of the key board on the table, and thus an operator's action to the equipment is necessarily restricted to an operation using his right or left hand. This restriction of the operator's action constitutes a remarkable obstacle to the operation of the input key, and the disadvantage that the operator's action is necessarily restricted to the operation using his right or left hand also constitutes an obstacle to a simultaneous operation of both of the mouse or track ball and the input key, so that there occurs a disadvantage that an effective input operation can not be performed.

Further, since the printer can not be used unless the display is slantly approached to the key board and the recording sheet is inserted through the sheet supply port, the user can not visually check both of the recording sheet which is being subjected to a printing operation and the screen of the display on which a printed image is being displayed. Therefore, an operator's visual comparing check can not be performed unless the printing operation is completed, and thus a series of printing operations and the visual comparing check are ineffectively carried out.

SUMMARY OF THE INVENTION

This invention was made in view of the foregoing, and has an object to provide an electronic information apparatus in which effective use of a surface space of the key board is achieved to satisfy the requirement of miniaturization of the apparatus, the input operation of the instruction input device can be effectively carried out, and a series of printing operations and a visual compare checking operation can be remarkably effectively carried out.

In order to attain the above object, an electronic information apparatus according to this invention includes a display provided to an apparatus body for displaying a data on a screen thereof, and a key board having plural input keys and provided at a front side on an upper surface of the apparatus body, is characterized in that the plural input keys are collected into two sets of input keys, and the two sets of input keys are eccentrically located at right and left sides with respect to a central portion on the upper surface of the key board and inclined from a front end of the key board toward a rear end thereof in such a manner as to be symmetrical at the right and left sides on the key board.

Each of the two sets may be constructed by rows of plural laterally-arranged input keys which are arranged in a planar and substantially-rectangular form, in which a distance between neighboring rows at the front side is set to be longer than a distance between neighboring rows at the rear side.

Further, a pointing device may be interposed between the sets of input keys at the center on the upper surface of the key board.

In addition, the pointing device may comprise a track ball input device having a rotatably-driven track ball which is freely detachably installed in a mount hole formed at the center on the upper surface of the key board.

Further, inside of the apparatus body may be provided a detector for detecting a security state on the basis of detachment of the track ball from the mount hole.

Still further, a palm rest for supporting a palm with which the pointing device is operated may be mounted at the front side on the upper surface of the key board.

Still further, the apparatus body may contain a built-in voice input device provided at the front side of the sets of input keys.

Still further, an electric wave transmitter-receiver may be provided adjacently to the display and at the rear side of the sets of input keys on the key board.

Still further, the display may contain built-in voice output speakers at both sides of the screen thereof.

Still further, the display may be pivotally supported through a hinge at the rearmost end of the apparatus body.

Still further, a built-in printer may be provided between said hinge and said electric wave transmitter-receiver at a rear portion of said apparatus body.

In addition, the printer may include a sheet supply port formed adjacently to the hinge in the apparatus body, a sheet discharge port formed at a parabola antenna side in the apparatus body, a sheet passageway for performing intercommunication between the sheet supply port and the sheet discharge port, a platen roller rotatably supported by a shaft at the central portion of the sheet passageway in such a manner as to be slidable along a reverse surface of a recording sheet, a driving motor for rotating the platen roller, an auxiliary roller which is driven-rotatably supported by a shaft and has a peripheral surface partially located in the sheet passageway so as to be slidable along an obverse surface of the recording sheet, and a printing head for performing a printing on the surface of the recording sheet, the printing head being slidably mounted inside of the apparatus body and located beneath the platen roller.

Further, the sheet supply port is inclined toward the hinge.

Still further, the sheet discharge port has an upper edge portion projecting toward said hinge.

According to the electronic information apparatus according this invention, a key board of the apparatus has plural input keys and provided at a front side on an upper surface of the apparatus body, in which the plural input keys are divided into two groups, the groups being spaced with each other, the plural input keys of each group are arranged in plural rows, row arrangement directions of the groups across each other with a predetermined angle, and the group being arranged as to be substantially symmetrical with respect to a center line extending from a front end of the key board to a back end of the key board.

Therefore, it is hardly required for an operator to bend his wrists in a horizontal direction in an input operation, so that the input work using the input keys can be remarkably functionally carried out.

Further, since the pointing device is provided between the groups of input keys at the center on the surface of the key board, the instruction input device can be operated by any one of the right and left hands, that is, it is possible that the instruction input device is operated by the right hand when the set of input keys at the left side are operated, while it is operated by the left hand when the group of input keys at the right side are operated. Therefore, the input operation of the instruction input device and the input operation of the input keys can be easily carried out in parallel with each other. In addition, this parallel input operation enables the function of the input keys to be implemented by the instruction input device, so that the total number of the input keys can be largely reduced.

Further, since the detector for detecting the security on the basis of the detachment of the track ball from the mount hole is buried inside of the apparatus body, an outsider can be surely prevented from using the electronic information apparatus insofar as the operator keeps the track ball.

Still further, since the palm rest for supporting a hand with which the pointing device is operated is provided at the front side on the surface of the key board, the track ball can be stably rotated and a misoperation can be prevented to perform a stable operation.

Still further, the built-in voice input device is provided at the front side of the plural input key sets in the apparatus body, a voice input to the personal computer may be implemented using the voice input device.

In addition, since the electric wave transmitter-receiver is provided adjacently to the display at the rear side of the plural input key sets on the upper surface of the key board, a multi-functional input operation is achievable.

In addition, since the built-in voice output speakers are provided at both sides of the screen of the display, the voice output is achievable using the speakers.

Further, the printer includes a sheet supply port formed adjacently to the hinge in the apparatus body, a sheet discharge port formed at a parabolic antenna side in the apparatus body, a sheet passageway for performing inter-communication between the sheet supply port and the sheet discharge port, a platen roller rotatably supported by a shaft at the central portion of the sheet passageway in such a manner as to be slidable along a reverse surface of a recording sheet, a driving motor for rotating the platen roller, an auxiliary roller which is driven-rotatably and supported by a shaft and has a peripheral surface partially located in the sheet passageway so as to be slidable along an obverse surface of the recording sheet, and a printing head for performing a printing on the surface of the recording sheet, the printing head being slidably mounted inside of the apparatus body and located beneath the platen roller, thereby printing a displayed image on the screen of the display very easily.

Further, since the upper edge portion of the sheet discharge port is designed so as to be projected toward the hinge, a printed data on the recording sheet can be checked while overlapped with a displayed data on the screen of the display. Therefore, the printing data can be easily checked simultaneously with the printing operation, an error which would be liable to be overlooked for the displayed data on the screen of the display can be surely found out, and an operator can rapidly cope with cease of a printing operation, etc.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

DESCRIPTION OF THE PREFERRED EMBODIMENT

A preferred embodiment according to this invention will be described hereunder with reference to FIGS. 1 through 9.

In this embodiment, a lap top type personal computer (PC) 1 is used as an electronic information apparatus, however, a word processor may be used.

Figure 1:
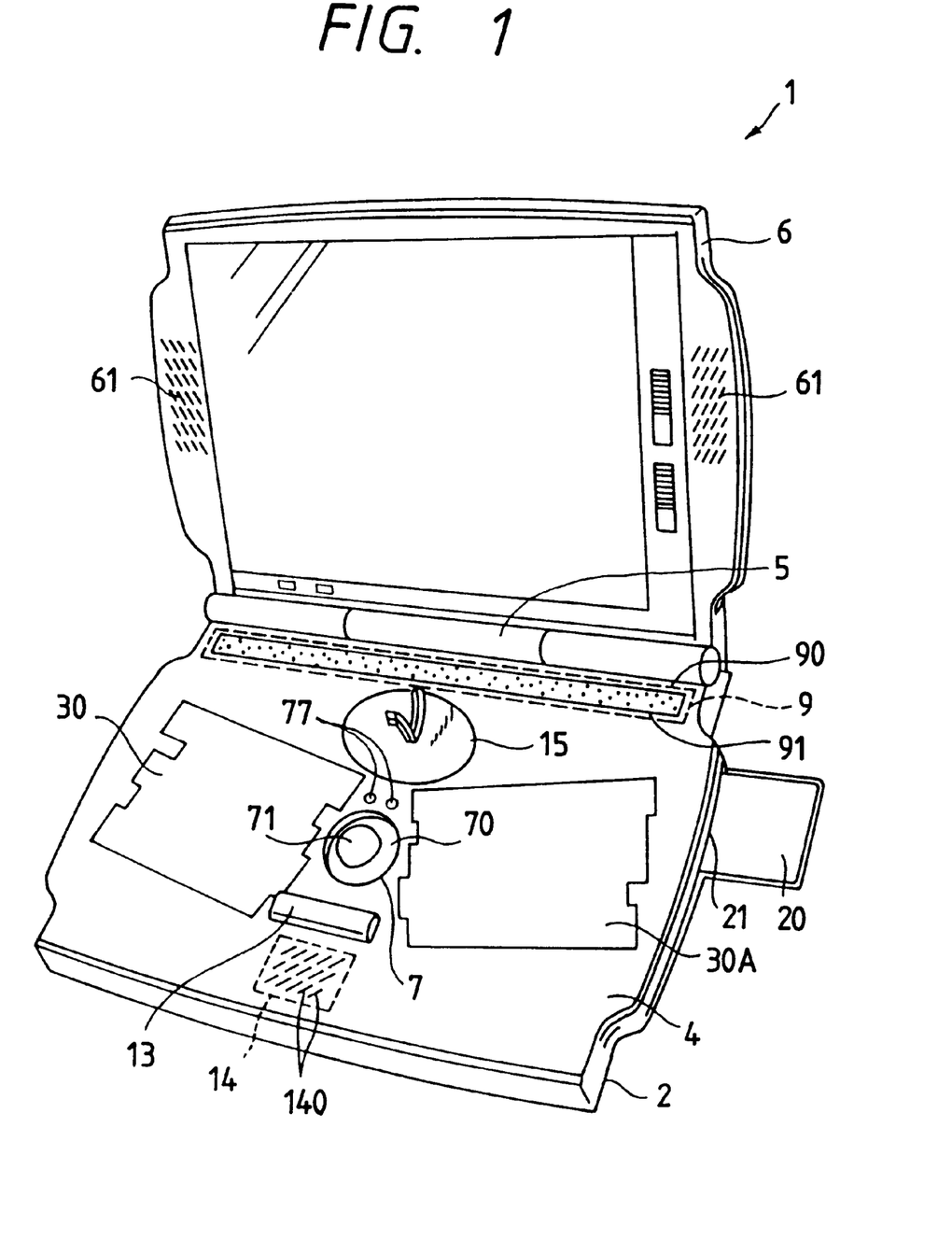
FIG. 1 is a perspective view of a personal computer having a key board of an embodiment according to the present invention.

A portable lap top type of personal computer of the embodiment of this invention as shown in FIG. 1 has a substantially rectangular structure of thin thickness as a whole, and includes a PC body 2 mounted on a table, a key board 4 which has plural input keys 3 and is provided at a front side on the upper surface of the PC body 2, and a rotatable display 6 which is designed so as to be pivotally mounted through a hinge 5 at the rearmost end of the PC body 2 and cover the key board 4. The personal computer is also equipped with a track ball input device 7 serving as an instruction input device (pointing device). The PC 1 also has a built-in printer 9 for perform a printing on a recording sheet 8 at a rear portion of the PC body 2, and the built-in printer 9 has a sheet supply port 90 and a sheet discharge port 91 which are exposed to an external at the rear portion on the upper surface of the PC body 2. The PC body 2 contains therein various units such as a CPU, a RAM, a ROM, an input/output interface, etc. (not shown), and these units are interconnected with one another through a bus, that is, a control line to constitute a computer. The PC body 2 is further provided with a slot 21 for freely removably accommodating an IC card 20 at the rear portion of the right side thereof as shown in FIGS. 1 and 2.

Figure 2:
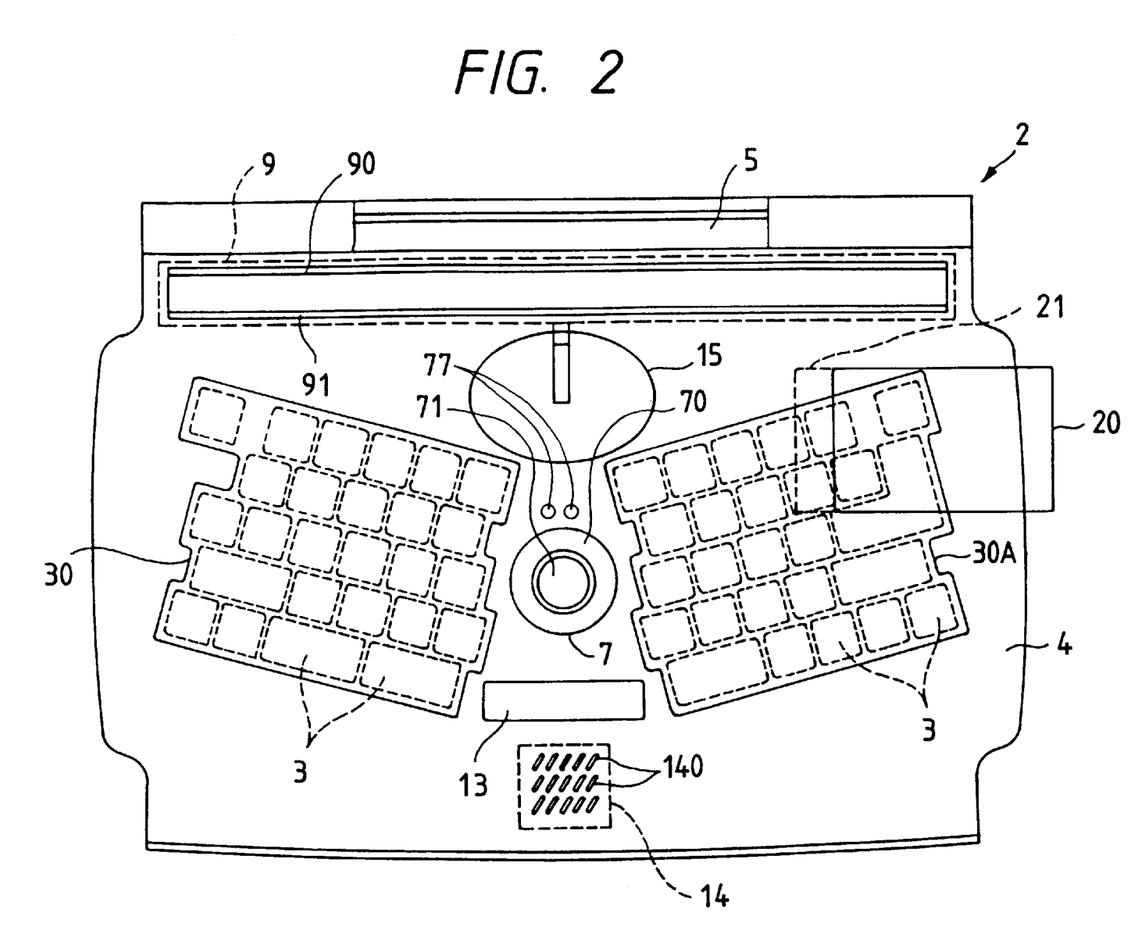
FIG. 2 is a plane view of a key board portion of the personal computer of the embodiment.

As shown in FIGS. 1 and 2, the plural input keys 3 are collected into two input key sets 30 and 30A which have a planar and substantially rectangular shape and located at the right and left sides, respectively. The input key sets 30 and 30A are eccentrically and separately arranged at both sides with respect to a center line X of the key board 4 in such a manner as to be symmetrically inclined with respect to the center line X from the front end of the key board 4 toward the rear end thereof.

In other words, in view of a human engineering, lateral rows of the input key set 30 at the left side of the key board 4 are slantly designed in an upper-and-left direction with respect to the front end of the key board 4 while the lateral rows of the input key set 30A at the right side of the key board 4 are slantly designed in an upper-and-right direction with respect to the front end of the key board 4. Viewed at the human engineering angle, human hands are inherently designed due to the structure of shoulders and elbows such that left and right hands are apt to be inclined to right and left directions, respectively. However, it is hardly required for an operator to bend his wrists horizontally because the two input key sets 30 and 30A are symmetrically inclined, so that an information input work can be remarkably effectively and functionally carried out. In one embodiment of the present invention, a distance between neighboring rows at the front side of the key board 4 is set to be longer than a distance between neighboring rows at the rear side of the key board 4.

Figure 4:
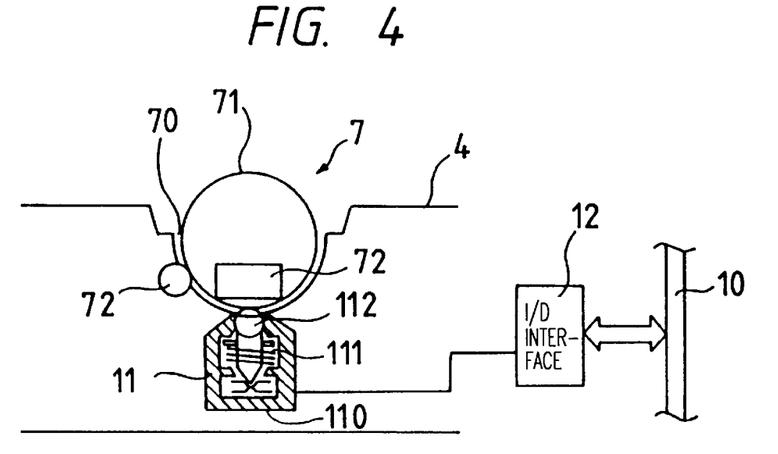
FIG. 4 is a sectional view of a track ball portion of the personal computer of the embodiment.
Figure 5:
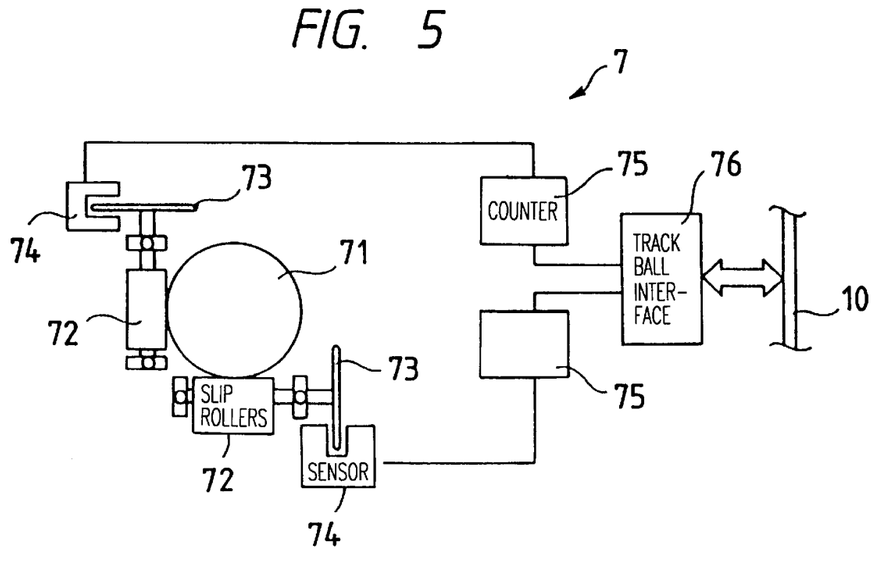
FIG. 5 shows the inner structure of a track ball input device of the personal computer of the embodiment.

In addition, as shown in FIGS. 1 and 2, the key board 4 is equipped with a track ball input device 7 interposed between the two input key sets 30 and 30A on the center line X on the surface thereof. As shown in FIGS. 4 and 5, the track ball input device 7 includes a mount hole 70 having a substantially-semispherical section which is recessed at the center line on the surface of the key board 4 and has a through hole formed in the bottom thereof, a spherical track ball 71 which is freely detachably installed in the mount hole 70 and rotatably operated by a palm, two slip rollers 72 which are rotatably provided in such a manner as to be orthogonally intersected to each other, each having a peripheral surface portion which penetrates through the mount hole 70 and is slidably contacted with a lower peripheral surface of the track ball 71, slit disks 73 each of which is coaxially engaged with a shaft of each of the slip rollers 72 and has two rows of slits (not shown) formed thereon concentrically and with phase difference, two sensors 74 each of which is provided so as to sandwich an edge portion of each of the slit disks 73 and serves to detect rotation of each slit disk 73 and output a detected result to each counter 75, a track ball interface 76 for receiving the output signals of the counters 75, and two switches 77 which are juxtaposed to each other and located adjacently to and at the rear side of the track ball 71. With this construction, the track ball input device 7 is provided with a function of detecting the rotation and the rotational direction of the track ball 71.

Therefore, when the operator rotates the track ball 71 installed in the mount hole 70 by his palm, the two slip rollers 72 are rotated to rotate the slit disks 73, and then the two sensors 74 detect the rotation and the rotational direction of the track ball 71 through the slits of the rotating slit disks 73 to output a detection value. As shown in FIG. 5, the output signals from the sensors 74 are accumulated in the counters 75, respectively, and then outputted through the track ball interface 76 to a bus 10 of a computer circuit as a rotational amount in orthogonally-intersected X and Y directions. Through these operations, a cursor shift on the screen of the display 6 is instructed.

In the construction as described above, since the track ball input device 7 is located on the center line X on the surface of the key board 4, and interposed between the input key sets 30 and 30A, the operator can operates the track ball 71 very easily by any one of his right and left hands, and a simultaneous operation of the track ball 71 and the input keys 3 can be expected to be easily carried out. In this embodiment, the track ball 71 is used as the pointing device, however, a compact mouse may be used.

A security switch 11 for detecting a security state, which serves as a detector having a security detecting function for the PC 1, is buried inside the PC body 2 and located beneath the track ball input device 7. As shown in FIG. 4, The security switch 11 is of a type in which an opening and closing operation of a contacting point thereof is switched in accordance with presence of the track ball 71, and includes a cylindrical body 110 having a closed bottom which is buried inside of the PC body 2 and located beneath the mount hole 70, a coil spring 111 vertically arranged within the cylindrical body 110, and a sphere 112 which is urged by an urging action of the spring coil so that it penetrates through an upper hole of the body 110 and the through hole of the mount hole 70 and a peripheral portion thereof is partially exposed to the external. The security switch 11 is so designed as to be switched on when the sphere 112 is downwardly urged through an installation of the track ball 71 into the mount hole 70, and to be switched off when the sphere 112 is upwardly urged through a detachment of the track ball 71 from the mount hole 70. In this embodiment is used the security switch 11 for detecting a security state of the personal computer on the basis of an up-and-down movement of the sphere 112 which is urged by the coil spring 111, however, may be used an photosensor or the like for the same object. An output signal from the security switch 11 is supplied through the input/output interface 12 to the bus 10 of the computer circuit, and security of the personal computer is assured by a control using the output signal in accordance with a flowchart of FIG. 6. The control of the flowchart of FIG. 6 will be described hereunder, where S represents each control step.

Figure 6:
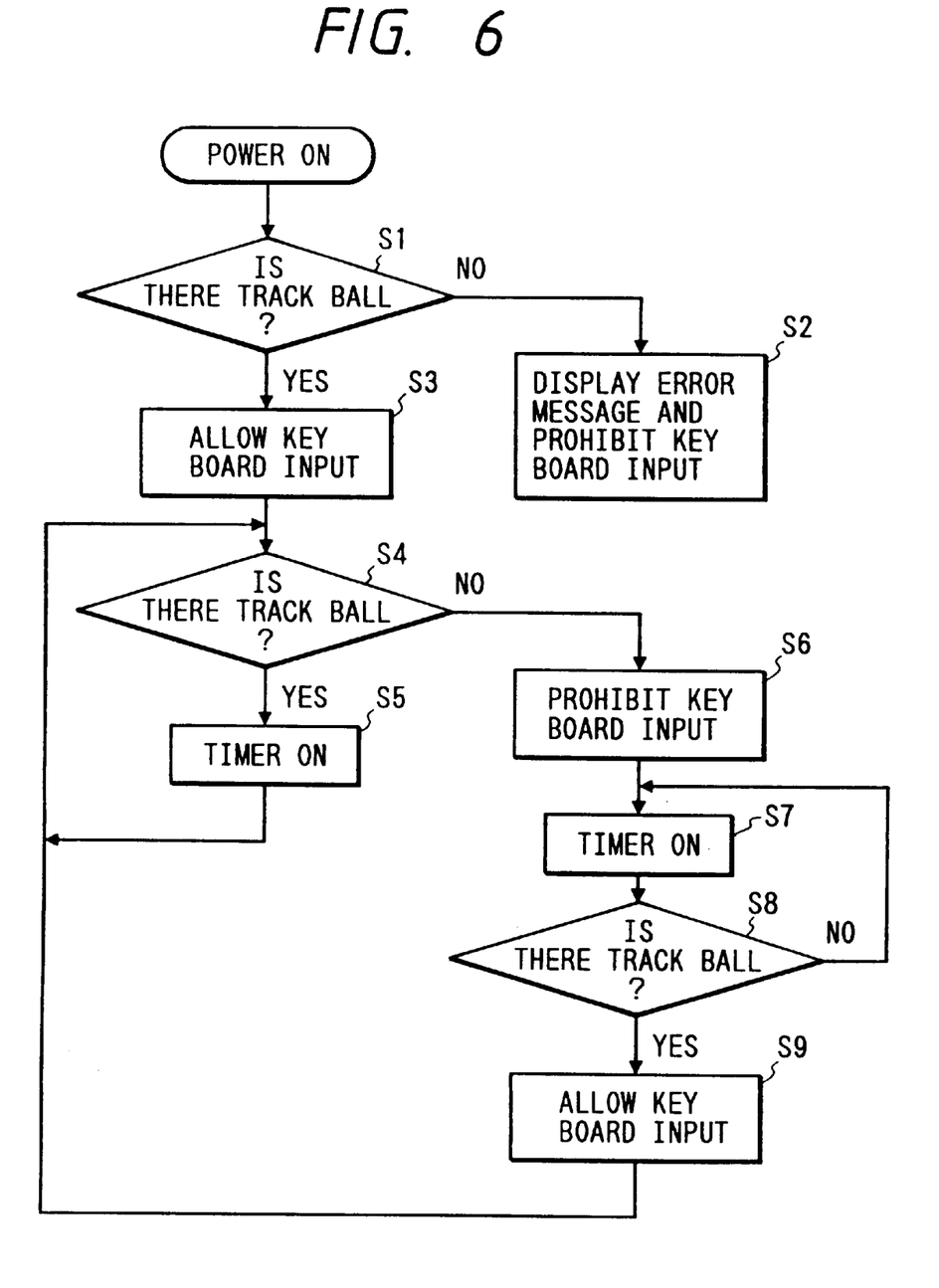
FIG. 6 is a flow-chart diagram of security operations of in a security system using a track ball in the personal computer of the embodiment.

In FIG. 6, a power switch (not shown) of the PC 1 is switched on to start a control process for the security of the PC 1, and then on the basis of an output signal from the security switch 11 it is judged as to whether the track ball 71 is installed in the mount hole 70 (S1).

When the track ball 71 is not installed in the mount hole 70, the connection between the bus 10 of the computer circuit and both of the input key sets 30 and 30A is cut off, so that an input operation with the input key sets 30 and 30A, that is, a key board input is prohibited (S2). Simultaneously with the prohibition of the key board input, "Prohibit key board input because of no track ball" is displayed on the display 6.

Conversely, when the track ball 71 is installed in the mount hole, the two input key sets are connected to the bus 10 of the computer circuit, and thus the key board input is permitted (S3). Thereafter, on the basis of the output signal from the security switch 11, it is judged again whether the track ball 71 is installed in the mount hole 70 (S4). When the track ball 71 is installed in the mount hole 70, the key board input is left permitted, and at the same time a built-in timer (not shown) of the computer circuit is actuated (S5) so that the installation of the track ball 71 in the mount hole 70 after a predetermined time elapses is judged again (S4). Accordingly, insofar as the track ball 71 is installed in the mount hole 70, the steps S4 and S5 are repeated to leave the key input board to be permitted.

When the track ball 71 is not installed in the mount hole 70, the key board input is prohibited (S6), and then the timer as described above is actuated (S7) to judge again on the basis of the output signal of the security switch 11 whether the track ball is installed in the mount hole 70 after a predetermined time elapses (S8). The steps S7 and S8 are repeated until the installation of the track ball 71 in the mount hole 70 is ascertained. When the installation of the track ball 71 in the mount hole 70 is ascertained, the two input key sets 30 and 30A are connected to the bus 10 of the computer circuit to permit the key board input (S9).

Thereafter, on the basis of the output signal from the security switch 11, the installation of the track ball 71 in the mount hole 70 is judged again (S4). On the basis of this judgment result, a control process of the steps S4 and S5 or another control process of the steps S4 to S9 is repeated.

As is apparent from the foregoing description, the key board input of the PC 1 according to this invention is prohibited insofar as the track ball 71 is not installed in the mount hole 70. Therefore, it can surely prevent the abuse of the PC 1 by an outsider that the operator merely keeps the track ball 71, so that data leakage due to the abuse of the outsider which has been recently considered can be surely prevented.

As shown in FIGS. 1 and 2, the key board 4 is further equipped with a palm rest comprising a rectangular parallelopiped projection which is mounted on the center line X on the surface thereof in such a manner as to be orthogonal to the center line X, and located in front of the track ball 71. The palm rest is so designed as to support an operator's wrist thereon. Therefore, the operator can surely perform a stable rotating operation of the track ball 71 without misoperation by placing on the palm rest 13 his palm by which the track ball 71 is operated.

Further, as shown in FIGS. 1 and 2, the PC body 2 is equipped with a microphone 14 serving as the voice input device which is buried in the PC body 2. The microphone 14 is disposed adjacently to the palm rest 13 at the front end on the center line on the surface of the key board 4. As shown in FIG. 2, the microphone 14 includes an internal device (not shown) and plural slits 140 formed slantly in juxtaposition with one another at the front side on the surface of the key board 4. The operator can perform a voice input to the PC using the microphone 14.

Figure 7:
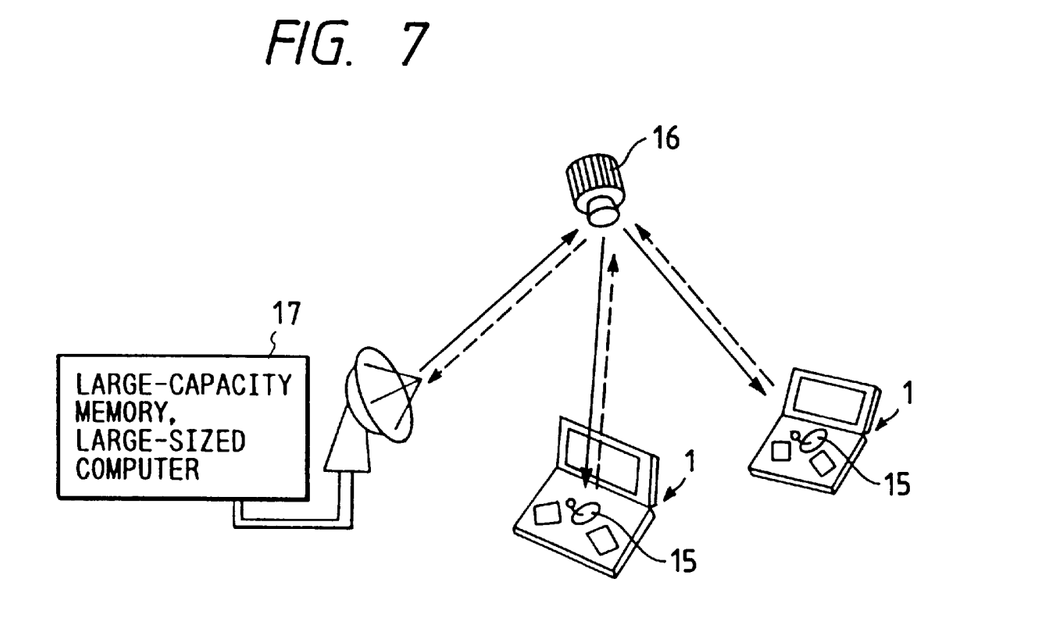
FIG. 7 shows a communication system using an artificial satellite and the personal computer of the embodiment.

As shown in FIGS. 1 and 2, the key board 4 is further equipped with a parabolic antenna 15 serving as the electric wave transmitter-receiver which is rotatably mounted at the rear portion of the input key sets 30 and 30A and on the center line X on the surface of the key board 4. The parabolic antenna 15 is so designed that it is erected in use of the PC, and laid down so as to allow the display 6 to cover the key board 4 in non-use of the PC 1, and is connected through a communication interface to the bus 10 of the computer circuit. Therefore, as shown in FIG. 7, using the parabola antenna 15 the PC 1 can be connected to a large-size and large-capacity computer system 17 having a large sized computer and a large-capacity memory through an artificial satellite 16, for example.

Therefore, the PC 1 inherently has low operating capability and small memory capacity, but is provided with the same capability as the computer system 16 by installing the parabola antenna to the PC 1.

Further, the PC 1 having the parabola antenna as described above can be easily connected to a large sized computer system at a remote place where no telephone line is provided, unlike a PC having no parabola antenna which is ordinarily connected to a large sized computer system using a modem or the like. In addition, television or video broadcasting can be easily received on the display 6.

Figure 3:
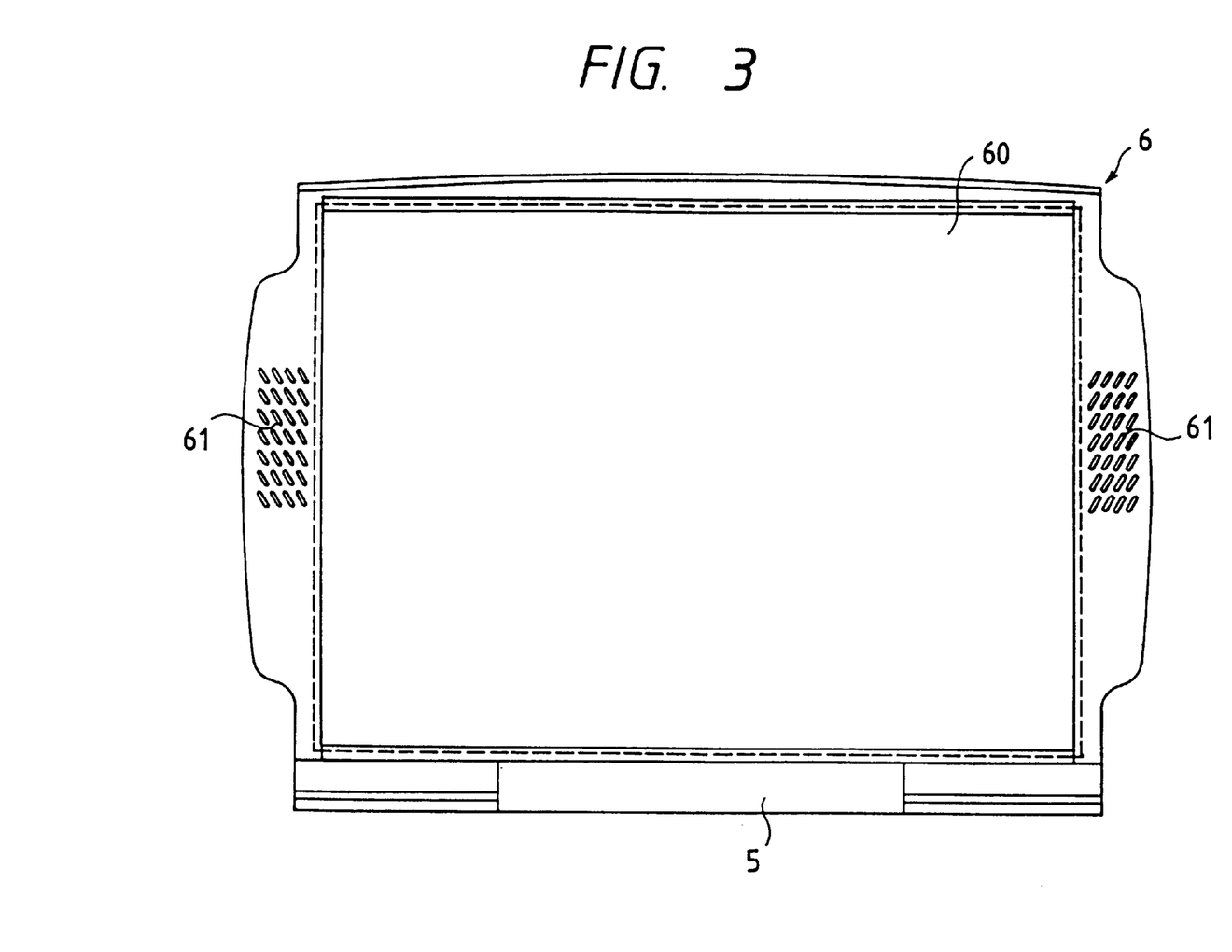
FIG. 3 is a plane view of a display portion of the personal computer of the embodiment.

As shown in FIGS. 1 and 3, the display 6 has a display body 60 comprising a liquid crystal display at the surface thereof which faces the key board 4, and is used in its operation in such a state that it is erected slightly slantly toward the hinge 5. The display 6 is equipped with built-in voice output speakers 61 at both sides of the display body 60.

Therefore, using the voice output speakers 61, the operator can receives a voice output in a stereo mode. In this embodiment, the display body 60 is integrally and undetachably formed on the surface facing the key board 4. However, the display body 60 may be so designed as to be freely detachably installed on the display 6.

Figure 8:
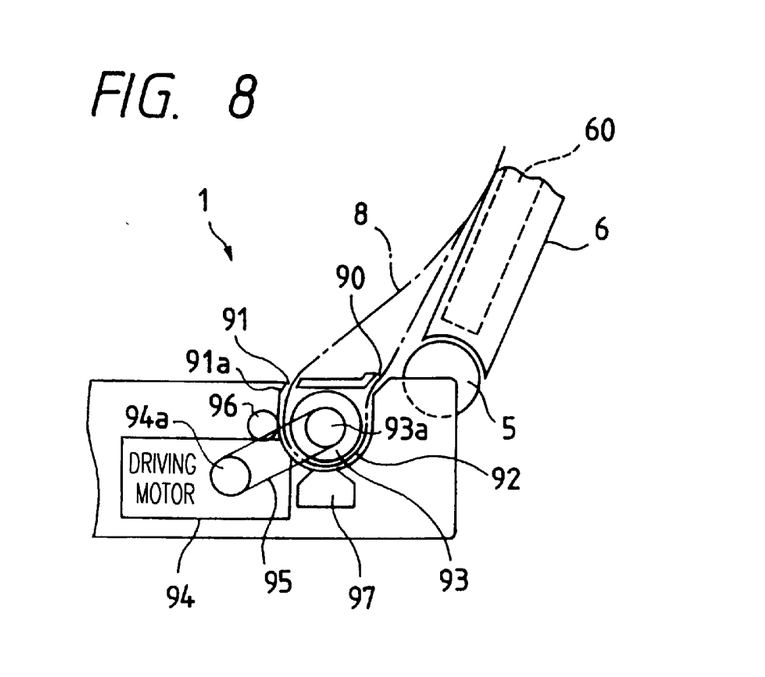
FIG. 8 shows a detailed structure of an printer portion of the personal computer of the embodiment.
Figure 9:
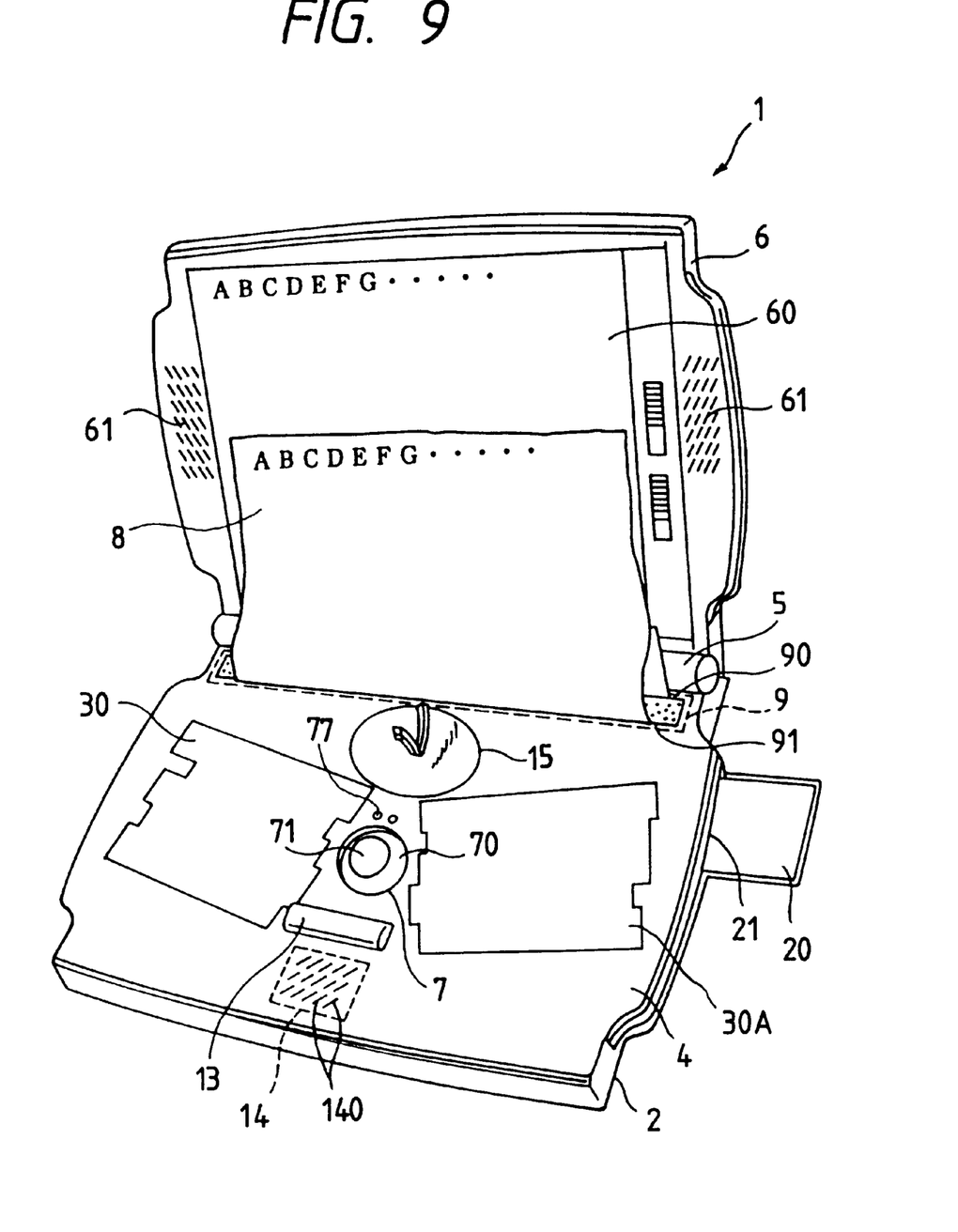
FIG. 9 is a perspective view of the personal computer of the embodiment which is printing out data on a paper.

As shown in FIGS. 8 and 9, the built-in printer 9 is provided at a rear portion of the PC body 2, and interposed between the hinge 5 and the parabola antenna 15. The printer 9 includes a sheet supply port 90 which is formed in the PC body and located at the side of the hinge 5, a sheet discharge port 91 which is formed in the PC body 2 and located at the side of the parabola antenna 15, a substantially U-shaped sheet passageway 92 which intercommunicates the sheet supply port 90 and the sheet discharge port 91 in a curved form, a platen roller 93 which is rotatably supported by a shaft at the center portion of the sheet passageway 92 and is slidably contacted with a reverse surface of a recording sheet 8, an endless belt 95 which is suspensively supported between a pulley of the platen roller 93 and a pulley of a driving motor 94, an auxiliary roller 96 which is drivenrotatably supported by a shaft in the PC body 2 and has a peripheral surface partially penetrating through the sheet passageway and in slidable contact with the obverse surface of the recording sheet 8, and a printing head 97 for performing a printing on the surface of the recording sheet 8 which is slidably provided inside of the PC body 2 and located beneath the platen roller 93.

As shown in FIG. 8, in order to easily perform sheet inserting and feeding operations of the recording sheet 8, the sheet supply port 90 is formed slantly toward the hinge 5 and the upper edge portion 91a of the sheet discharge port 91 at the hinge side is projected. The recording sheet 8 is upwardly discharged from the sheet discharge port 91 along the surface of the display body 60 of the display 6 which is slantly erected. Accordingly, upon actuating the driving motor 94 for a printing operation when the recording sheet 8 is inserted through the sheet supply port 90, as shown in FIG. 8 the belt 95 is rotated to cause the rotation of the platen roller 93, and the recording sheet 8 in contact with the platen roller 93 is curvedly fed from the sheet supply port 90 to the sheet discharge port 91 while inserted into the sheet passageway 92. At the same time, the auxiliary roller 96 is drivenly rotated to smooth the feeding operation of the recording sheet 8, and the printing head 97 located beneath the platen roller 93 is slid in a width direction to print an image on the surface of the recording sheet 8. Thereafter, as shown in FIGS. 8 and 9, the printed recording sheet 8 is guided to the upper edge portion 91 projected from the sheet discharge port 91, and upwardly discharged along the slantly erected display 6 in such a manner that a printed data of the recording sheet 8 is suitably overlapped with a displayed data on the display body 60.

Accordingly, using the printer 9 as described above, the operator can visually check the displayed image on the display body 60 and the printed result in printing operation at the same time, and compare an output recognized through the screen of the display body 60 with an actual output of the recording sheet 8 at once. In addition, efficiency of an editing work of the output can be largely improved.

As described above, according to the electronic information apparatus according this invention, a key board has plural input keys and provided at a front side on an upper surface of the apparatus body, the plural input keys are divided into two groups, the groups being spaced with each other, the plural input keys of each group are arranged in plural rows, row arrangement directions of the groups acrossing each other with a predetermined angle, and the groups are arranged as to be substatially symmetrical with respect to a center line extending from a front end of the key board to a back end of the key board. Therefore, there is a marvelous effect that it is hardly required for an operator to bend his wrists in a horizontal direction in an input operation, and the input work using the input keys can be remarkably functionally carried out.

Further, since the pointing device is provided between the sets of input keys at the center on the surface of the key board, there is a marvelous effect that the instruction input device can be operated by any one of the right and left hands, that is, it is possible that the instruction input device is operated by the right hand when the set of input keys at the left side are operated, while it is operated by the left hand when the set of input keys at the right side are operated. In addition, there is a marvelous effect that the input operation of the instruction input device and the input operation of the input keys can be remarkably easily carried out in parallel with each other. Further, there is a marvelous effect that this parallel input operation enables the function of the input keys to be implemented by the instruction input device, so that the total number of the input keys can be largely reduced.

Further, since the detector for detecting the security on the basis of the detachment of the track ball from the mount hole is buried inside of the apparatus body, there is a marvelous effect that an outsider can be surely prevented from using the electronic information apparatus when the operator keeps the track ball.

Still further, since the palm rest for supporting a hand with which the pointing device is operated is provided at the front side on the surface of the key board, there is a marvelous effect that the track ball can be stably rotated and a misoperation can be prevented to perform a stable operation.

Still further, the built-in voice input device is provided at the front side of the plural input key sets in the apparatus body, there is a marvelous effect that a voice input to the personal computer may be implemented using the voice input device.

In addition, since the electric wave transmitter-receiver is provided adjacently to the display at the rear side of the plural input key sets on the upper surface of the key board, there is a marvelous effect that a multi-functional input operation is achievable.

In addition, since the built-in voice output speakers are provided at both sides of the screen of the display, there is a marvelous effect that the voice output is achievable using the speakers.

Further, the printer includes a sheet supply port formed adjacently to the hinge in the apparatus body, a sheet discharge port formed at a parabola antenna side in the apparatus body, a sheet passageway for performing intercommunication between the sheet supply port and the sheet discharge port, a platen roller rotatably supported by a shaft at the central portion of the sheet passageway in such a manner as to be slidable along a reverse surface of a recording sheet, a driving motor for rotating the platen roller, an auxiliary roller which is driven-rotatably and supported by a shaft and has a peripheral surface partially located in the sheet passageway so as to be slidable along an obverse surface of the recording sheet, and a printing head for performing a printing on the surface of the recording sheet, the printing head being slidably mounted inside of the apparatus body and located beneath the platen roller, so that there is a marvelous effect that a displayed image can be printed on the screen of the display very easily. Still further, since the sheet supply port is designed slantly toward the hinge side, there is a marvelous effect that the insertion and feeding of the recording sheet can be smoothly carried out.

Still further, since the upper edge portion of the sheet discharge port is designed so as to be projected toward the hinge, there is a marvelous effect that a printed data on the recording sheet can be overlapped with a displayed data on the screen of the display. Therefore, there is also a marvelous effect that the printing data can be easily checked simultaneously with the printing operation, an error which would be liable to be overlooked for the displayed data on the screen of the display can be surely found out, and an operator can rapidly cope with cease of a printing operation, etc.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

We claim:

1. An electronic information apparatus comprising:
   a keyboard component having plural input keys provided on an upper surface of said keyboard component;
   a flat-panel display component pivotally mounted on said keyboard component by a hinge; and a communication device serving as an electronic wave transmitter-receiver for communication with an artificial satellite, said communication device being provided on the upper surface of said keyboard component, said display component capable of covering said plural input keys of said keyboard component;

further comprising a parabolic antenna;

said parabolic antenna being disposed at a position where said parabolic antenna is exposed on the upper surface of said keyboard component in use of said electronic information apparatus;

said parabolic antenna being designed to be erected during use of said electronic information apparatus and laid down allowing said display component to cover said plural input keys of said keyboard component in non-use of said electronic information apparatus; and wherein said parabolic antenna further includes a depression provided on the upper surface of said keyboard component.

* * * * *